(12) United States Patent
Rubin et al.

(10) Patent No.: US 10,768,888 B1
(45) Date of Patent: Sep. 8, 2020

(54) WIRELESS CONTROL AND MODIFICATION OF ELECTRONIC AUDIO SIGNALS OF REMOTE ELECTRONIC DEVICES

(71) Applicant: Daniel W. Rubin, Ridgefield, CT (US)

(72) Inventors: Daniel W. Rubin, Ridgefield, CT (US); Logan P. Poelman, Minneapolis, MO (US)

(73) Assignee: Daniel W. Rubin, Ridgefield, CT (US)

( * ) Notice: Subject to any disclaimer, the term of this patent is extended or adjusted under 35 U.S.C. 154(b) by 0 days.

(21) Appl. No.: 16/287,426

(22) Filed: Feb. 27, 2019

(51) Int. Cl.
*G10H 1/00* (2006.01)
*G06F 3/16* (2006.01)
*H04R 3/00* (2006.01)

(52) U.S. Cl.
CPC ............... *G06F 3/162* (2013.01); *H04R 3/00* (2013.01)

(58) Field of Classification Search
CPC ........... H04W 88/02; G10H 2240/211; G10H 1/0066; G10H 2240/131; G10H 2240/075; G10H 2240/056; G10H 1/0058; G10H 2240/311; G10H 2240/175; G10H 2240/305; G10H 2240/321; G10H 1/00; G10H 1/0083; G10H 2240/301; G10H 2240/125; G10H 1/0033; G10H 2240/021; G10H 2240/031; H04H 60/82; H01Q 3/005
See application file for complete search history.

(56) References Cited

U.S. PATENT DOCUMENTS

| 8,509,692 | B2 * | 8/2013 | Ryle | H04H 20/33 |
| | | | | 455/39 |
| 2003/0094091 | A1 * | 5/2003 | Brinkman | G06Q 20/00 |
| | | | | 84/609 |
| 2003/0094092 | A1 * | 5/2003 | Brinkman | G06Q 20/00 |
| | | | | 84/609 |
| 2003/0196542 | A1 * | 10/2003 | Harrison, Jr. | G04B 25/00 |
| | | | | 84/737 |

(Continued)

*Primary Examiner* — Marlon T Fletcher
(74) *Attorney, Agent, or Firm* — Hickman Palermo Becker Bingham LLP

(57) ABSTRACT

Systems and methods for wireless control and modification of electronic audio signals of remote electronic devices are disclosed. In an embodiment, a second computing device receives, from a first computing device that is configured to read radio frequency identification (RFID) tags, a first RFID tag address of a first RFID tag. A first mapping that associates each RFID tag address of a plurality of RFID tag addresses with a musical instrument digital interface (MIDI) event message of a plurality of MIDI event messages is stored in one or more digital data repositories, the plurality of RFID tag addresses including the first RFID tag address. A second mapping that associates each MIDI event message of the plurality of MIDI event messages to a virtual action identifier of a plurality of virtual action identifiers is stored in one or more digital data repositories. The second computing device uses the first mapping to determine a first MIDI event message based on the first RFID tag address. The second computing device uses the second mapping to determine a first virtual action identifier based on the determined first MIDI event message. The second computing device instructs a sound producing device to execute an action associated with the determined first virtual action identifier.

17 Claims, 8 Drawing Sheets

(56) References Cited

U.S. PATENT DOCUMENTS

| | | | | |
|---|---|---|---|---|
| 2005/0094638 A1* | 5/2005 | Holm | ............... | H04H 60/07 |
| | | | | 370/389 |
| 2012/0084131 A1* | 4/2012 | Bergel | ............... | G06Q 20/40 |
| | | | | 705/14.26 |
| 2013/0032023 A1* | 2/2013 | Pulley | ............... | G10H 1/0066 |
| | | | | 84/645 |
| 2015/0331659 A1* | 11/2015 | Park | ............... | G06F 3/0346 |
| | | | | 700/94 |

* cited by examiner

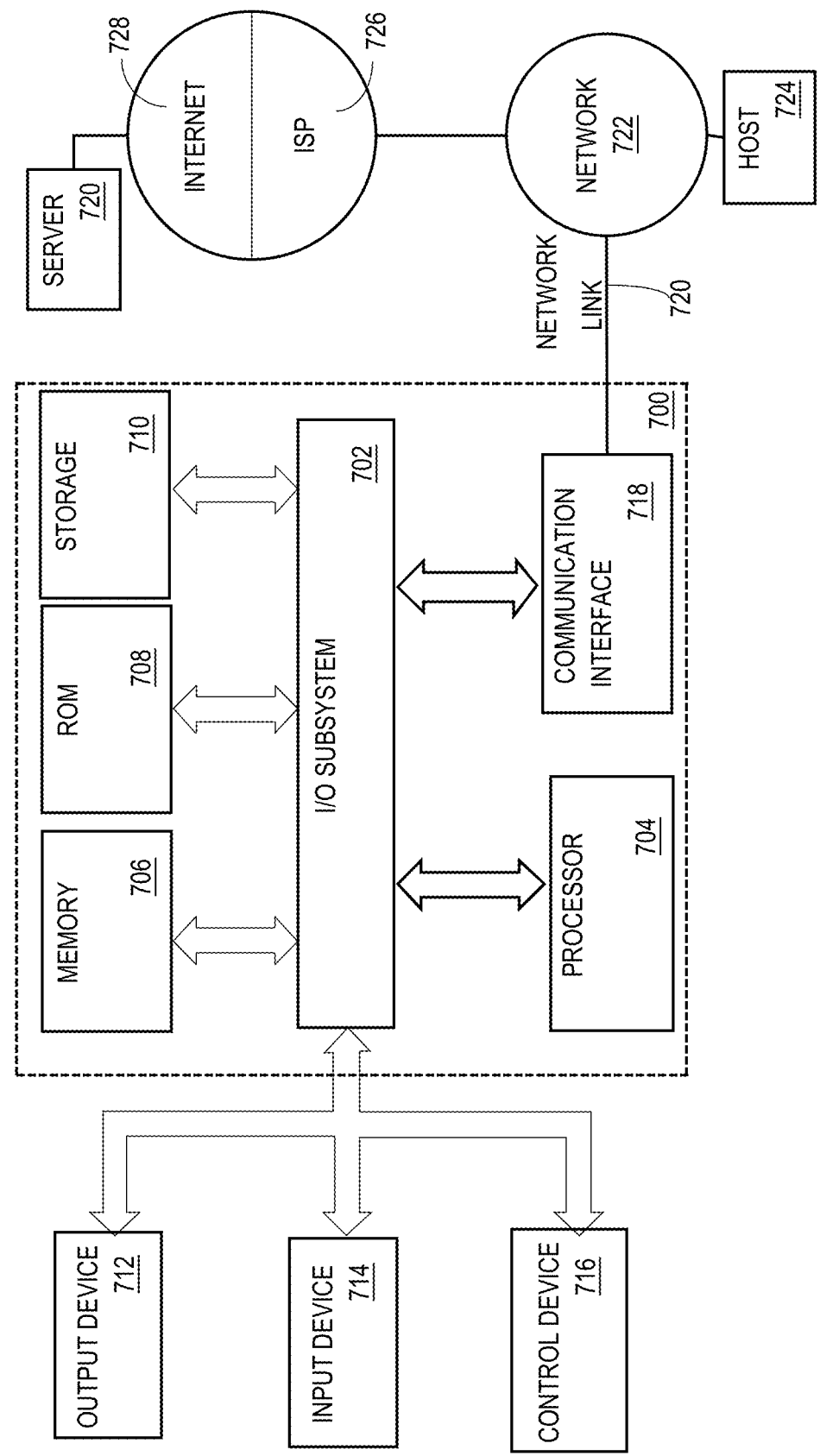

WIRELESS CONTROL AND MODIFICATION OF ELECTRONIC AUDIO SIGNALS OF REMOTE ELECTRONIC DEVICES

TECHNICAL FIELD

One technical field of the present disclosure is wireless manipulation of software system parameters in real time. Another technical field is wireless control of software devices by a performer in real time. Yet another technical field is wireless control of electronic effects systems used in music performance and recording, such as guitar effects pedals or effects software.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Musicians often use sound manipulation effects devices during their performances. Recently, many sound manipulation effects devices have moved from the physical domain, such as an effects pedal, to the software domain, such as a software program that digitally simulates an effects pedal. A common protocol for controlling such software devices is Musical Instrument Digital Interface (MIDI). Software effects have the advantage of being essentially unlimited in number for a performer, with the ability to control countless parameters from the software program.

However, manipulating a computing device such as a laptop, tablet or mobile phone that is running the effects software is not practical for a user or performer, who ultimately still requires a separate physical manifestation of the software device, such as a pedal board device, to manipulate its parameters in real time.

Electronic instrument manufacturers have historically accommodated this need by creating hardware pedal-board devices with a limited number of physical buttons or controls. Given that there are a limitless number of effects and parameter settings available in software programs, pedal board devices have increasingly been made larger and larger, with more physical buttons to give performers quick access to control more effects. However, this is not a scalable solution as practical limits exist as to the number of physical buttons a device maker can, or is willing to make, and the size, weight, and cost of a pedal board device that a user or performer is willing to use.

BRIEF DESCRIPTION OF THE DRAWINGS

In the drawings:

FIG. 7 shows a block diagram of a computer system with which an embodiment of the invention may be implemented.

DESCRIPTION OF EXAMPLE EMBODIMENTS

Figure 1A:
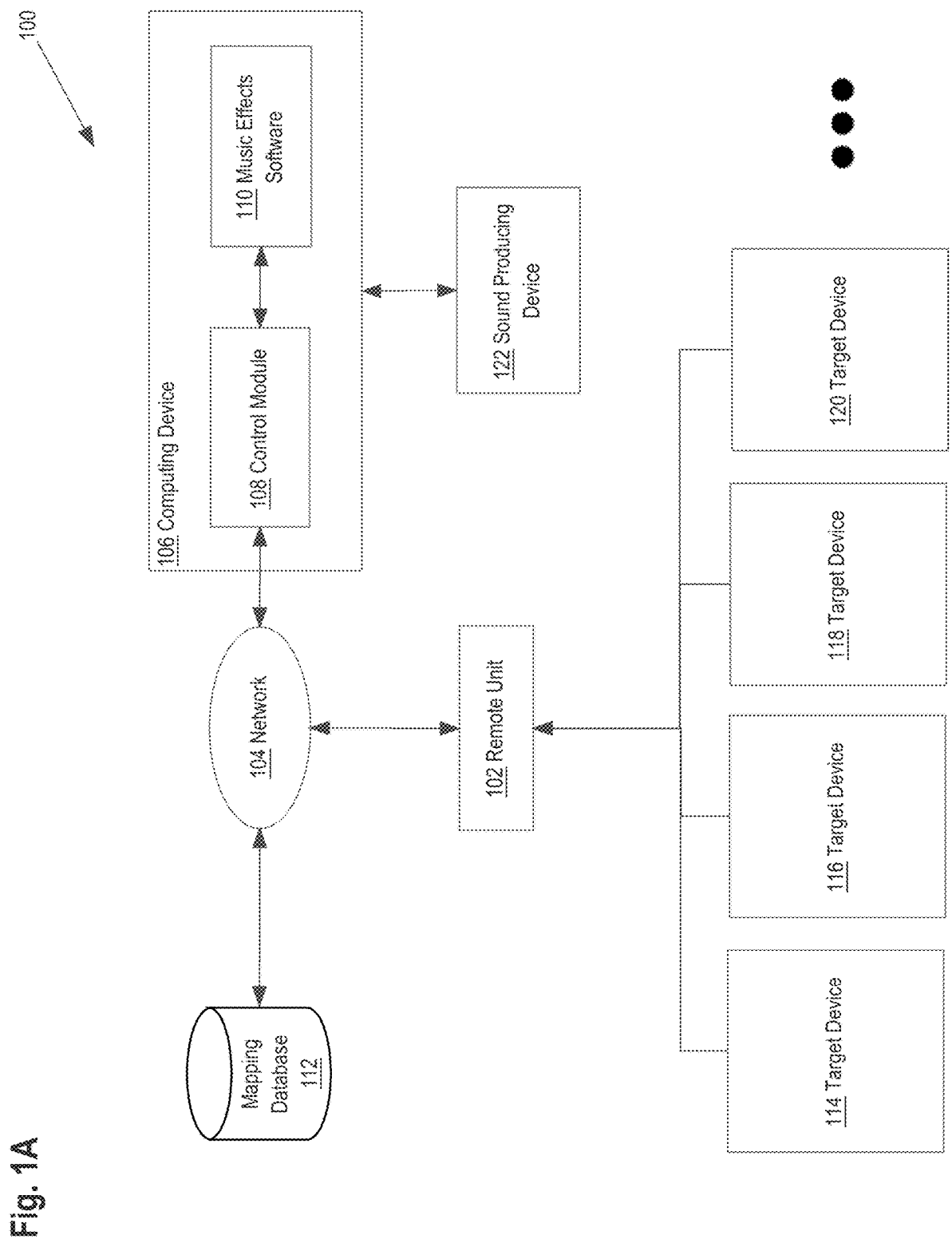
FIG. 1A illustrates a computer system in accordance with an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections according to the following outline:
1. OVERVIEW
2. EXAMPLE SYSTEM IMPLEMENTATION
3. EXAMPLE FUNCTIONAL IMPLEMENTATION
4. BENEFITS
5. IMPLEMENTATION EXAMPLE—HARDWARE OVERVIEW
6. EXTENSIONS AND ALTERNATIVES

1. OVERVIEW

Systems and methods for wireless control and modification of electronic audio signals of remote electronic devices are disclosed. One embodiment uses two computing devices. In this embodiment, a second computing device receives, from a first computing device that is configured to read radio frequency identification (RFID) tags, a first RFID tag address of a first RFID tag. A first mapping that associates each RFID tag address of a plurality of RFID tag addresses with a musical instrument digital interface (MIDI) event message of a plurality of MIDI event messages is stored in one or more digital data repositories, the plurality of RFID tag addresses including the first RFID tag address. A second mapping that associates each MIDI event message of the plurality of MIDI event messages to a virtual action identifier of a plurality of virtual action identifiers is stored in one or more digital data repositories. The second computing device uses the first mapping to determine a first MIDI event message based on the first RFID tag address. The second computing device uses the second mapping to determine a first virtual action identifier based on the determined first MIDI event message. The second computing device instructs a sound producing device to execute an action associated with the determined first virtual action identifier.

Other aspects, features and embodiments will become apparent from the disclosure as a whole. The described embodiments provide significant improvements to providing extensibility, scalability, and portability for live performers. Techniques described herein allow live performers to scale to and expressively control an unlimited number of live performance effects, resulting in enhanced displays of artistic expression. Additionally, techniques described herein allow live performers to extend their existing live effects configurations without investing substantial capital. Lightweight and compact RFID tags are easily transported and can be attached to any medium and used in synthesis with techniques described herein to control live performance effects, further enhancing the usability and value of such configurations. In amalgamation, techniques described herein enable vastly improved live performance capabilities of performers.

These techniques offer, in addition to the improvements discussed above, reduced usage of network bandwidth, CPU cycles, storage, and/or memory because of the efficiency and efficacy of the algorithms that are disclosed.

2. EXAMPLE COMPUTER SYSTEM IMPLEMENTATION

FIG. 1A is a block diagram of an example computer network system 100 in which various embodiments may be practiced. FIG. 1A is shown in simplified, schematic format for purposes of illustrating a clear example and other embodiments may include other elements.

In the example of FIG. 1A, a remote unit 102, mapping database 112, and computing device 106 are communicatively coupled directly or indirectly via network 104. These elements are shown to illustrate a clear example of an operating environment for the computer-implemented techniques that are claimed in this disclosure, but an implementation of the claims may not require all such elements.

The remote unit 102 may comprise any type of computing device that allows scanning target devices 114-120. Target devices 114-120 may each comprise a RFID tag or other similar technology. Any contactless smart card that works though other protocols may be used. The target devices 114-120 may be used to allow the remote unit 102 to extract the identification information, such as an RFID tag address, from each target device 114-120 without a user having to actively present the target device 114-120 to the remote unit 102. Remote unit 102 may also transmit and store information on target devices. Four target devices 114, 116, 118, 120 are depicted in FIG. 1A, however, any number of target devices may exist.

Remote unit 102 may communicate with computing device 106 and mapping database 112 using a wide variety of wireless communications and protocol and the invention is not limited to mobile wireless devices on any particular wireless communication method or protocol or any particular frequency range. Example wireless communication methods and protocols include, without limitation, cellular telephony communication methods (3G, 4G, etc.), 802.11x, 802.15x and Bluetooth.

Figure 2:
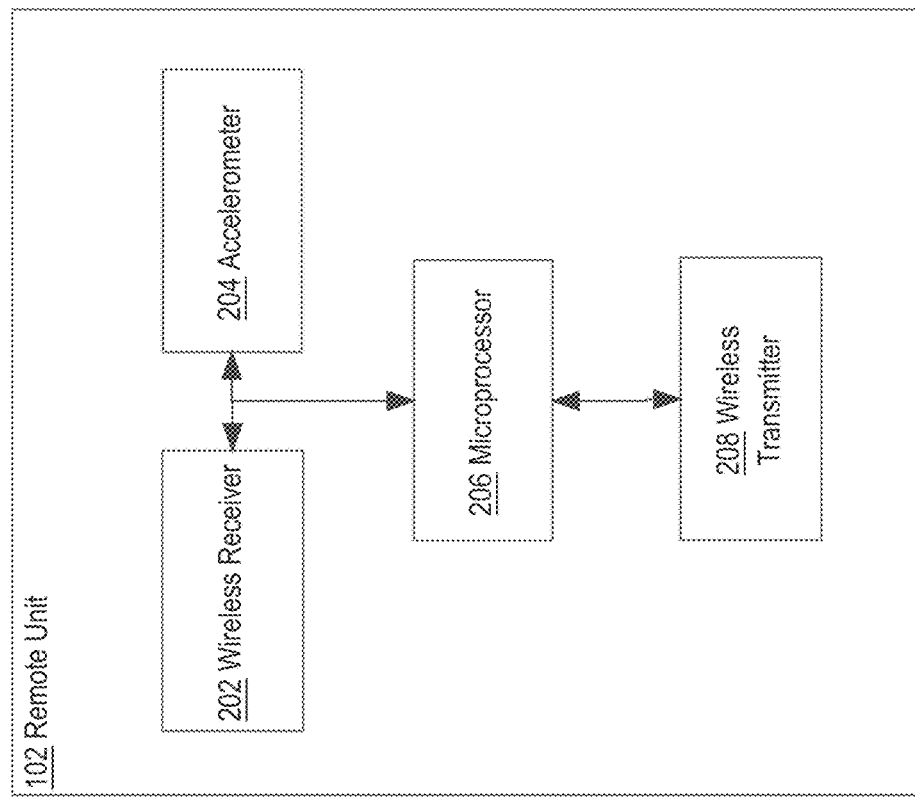
FIG. 2 is a block diagram that depicts an example architecture for a remote unit from system 100, according to an embodiment of the invention.

FIG. 2 is a block diagram that depicts an example architecture for remote unit 102. In this example, the architecture for remote unit 102 includes several different types of modules that may be implemented in discrete hardware elements, computer software, or any combination of discrete hardware elements and computer software. Furthermore, remote unit 102 may include additional elements that are not depicted in the figures or described herein for purposes of brevity.

In the example of FIG. 2, wireless receiver 202, accelerometer 204, and wireless transmitter 208 are communicatively coupled to microprocessor 206. Memory and storage elements (not shown) may store information and instructions to be executed by microprocessor 206. For example, the microprocessor 206 may execute instructions that cause the wireless transmitter 208 to send a signal to a nearby target device such as an RFID tag and then cause the wireless receiver 202 to read the response from the RFID tag. In an embodiment, the response received by the wireless receiver 202 may include a RFID tag address that uniquely identifies the RFID tag. The microprocessor 206 may execute instructions that cause the accelerometer to provide numerical acceleration metrics. The microprocessor 206 may execute instructions that cause the cause the wireless transmitter 208 to transmit data over network 104 such as data received from the RFID tags such as an RFID tag address and/or data received from the accelerometer such as acceleration metrics.

Returning to FIG. 1A, the computing device 106 may comprise a laptop computer, tablet computer, smartphone, or any other type of computing device that allows execution of applications. Typically, the computing device 102 executes a control module 108 and hosts music effects software 110 as one or more applications or apps, services or other executables. The control module 108 and music effects software 110 may receive input via network from remote unit 102. The control module 108 and music effects software 110 may also query mapping database 112 for data required to execute procedures described herein. The computing device 106 by way of the control module 108 and/or music effects software 110 may send output to sound producing device 122 via an I/O interface.

Figure 3:
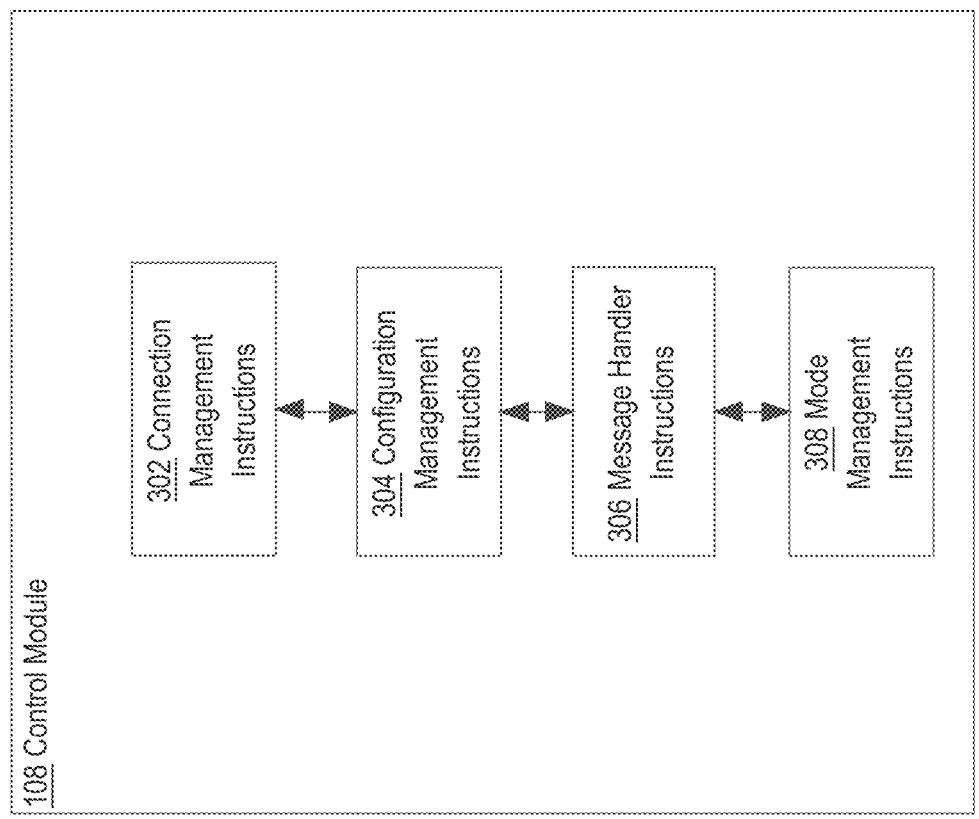
FIG. 3 is a block diagram that depicts an example architecture for a control module from system 100, according to an embodiment of the invention.

FIG. 3 is a block diagram that depicts an example architecture for control module 108. In this example, the architecture includes several different types of modules that may be implemented in discrete hardware elements, computer software, or any combination of discrete hardware elements and computer software. Furthermore, control module 108 may include additional elements that are not depicted in the figures or described herein for purposes of brevity.

In the example of FIG. 3, control module 108 comprises connection management instructions 302, configuration management instructions 304, message handler instructions 306, and mode management instructions 308. The instructions may be in machine executable code in the instruction set of a CPU and may have been compiled based upon source code written in JAVA, PYTHON, C, C++, OBJECTIVE-C, or any other human-readable programming language or environment, alone or in combination with scripts in JAVASCRIPT, other scripting languages and other programming source text.

The connection management instructions 302 may be programmed or configured to initiate and maintain an active wireless connection to the remote unit 102 via the network 104. The connection management instructions 302 may also be used for implementing aspects of the flow diagrams that are further described herein.

The configuration management instructions 304 may be programmed or configured to enable mapping of RFID tag addresses to MIDI event messages and/or mapping of MIDI event messages to virtual action identifiers. For example, configuration management instructions 304 may interact with a graphical user interface (GUI) coupled, directly or indirectly to computing device 106 to receive mapping information from a user. Configuration management instructions 304 may interact with mapping database 112 to store mappings or retrieve stored mappings. The configuration management instructions 302 may also be used for implementing aspects of the flow diagrams that are further described herein.

The message handler instructions 306 may be programmed or configured to receive or transmit messages to and from the remote unit 102 via network 104. For example, message handler instructions 306 may interact with the remote unit 102 to receive RFID tag addresses. The message handler instructions 306 may then interact with the configuration management instructions 304 to retrieve a mapping of RFID tag addresses to MIDI event messages, use the mapping to identify the corresponding MIDI event message, and transmit the corresponding MIDI event message to music effects software 110. The message handler instructions 302 may also be used for implementing aspects of the flow diagrams that are further described herein.

The mode management instructions 306 may be programmed or configured to control an operating mode such as switching between a mode for creating mappings of RFID tag address to MIDI event messages or a run mode for executing actions or events. The message handler instructions 302 may also be used for implementing aspects of the flow diagrams that are further described herein.

Returning to FIG. 1A, execution of music effects software 110 may include executing one or more programs or instructions that simulate functionality of sound effect pedals that can modify electronic audio signals. For example, instructions may simulate a particular sound effect pedal that modifies an electronic audio signal by introducing a delay, echo, or reverb to the electronic audio signal. An example of music effects software 110 includes Guitar Rig Pro by Native Instruments GmbH. Sound effect pedals may include but are not limited to distortion, overdrive, reverb, delay, and phaser effects.

Mapping database 112 may include digital data that representing a mapping that associates RFID tag addresses to MIDI event messages. The mapping database 112 may also include digital data representing a mapping that associates MIDI event messages to virtual action identifiers. Although the mapping database 112 is shown in FIG. 1 as connected to the computing device 106 and remote unit 102 via network 104, the mapping database 112 may be stored internally in either the remote unit 102 and computing device 106 and accessed locally.

Sound producing device 122 may comprise a loudspeaker, guitar speaker, headphones, or any device that converts an electrical audio signal into a corresponding sound. A guitar speaker is defined as a speaker that converts an electrical audio signal generated by a guitar sound producing device into a corresponding sound. The sound producing device 122 may receive an electronic audio signal from the computing device 106 and convert the electrical audio signal into a corresponding sound. Sound producing device 122 may be specialized for producing sound for electrical audio signals originally generated by an electric guitar, bass guitar, or acoustic guitar, as discussed herein.

Network 104 may be implemented by any medium or mechanism that provides for the exchange of data between the various elements of FIG. 1. Examples of network 104 include, without limitation, a cellular network, communicatively coupled with a data connection to the computing device 106 over a cellular antenna, one or more Local Area Networks (LANs), one or more Wide Area Networks (WANs), one or more Ethernets or the Internet, or one or more terrestrial, satellite or wireless links, or a combination thereof. For purposes of illustrating a clear example, network 104 is shown as a single element but in practice, network 104 may comprise one or more local area networks, wide area networks, and/or internetworks. The various elements of FIG. 1A may also have direct (wired or wireless) communications links, depending upon a particular implementation.

Figure 1B:
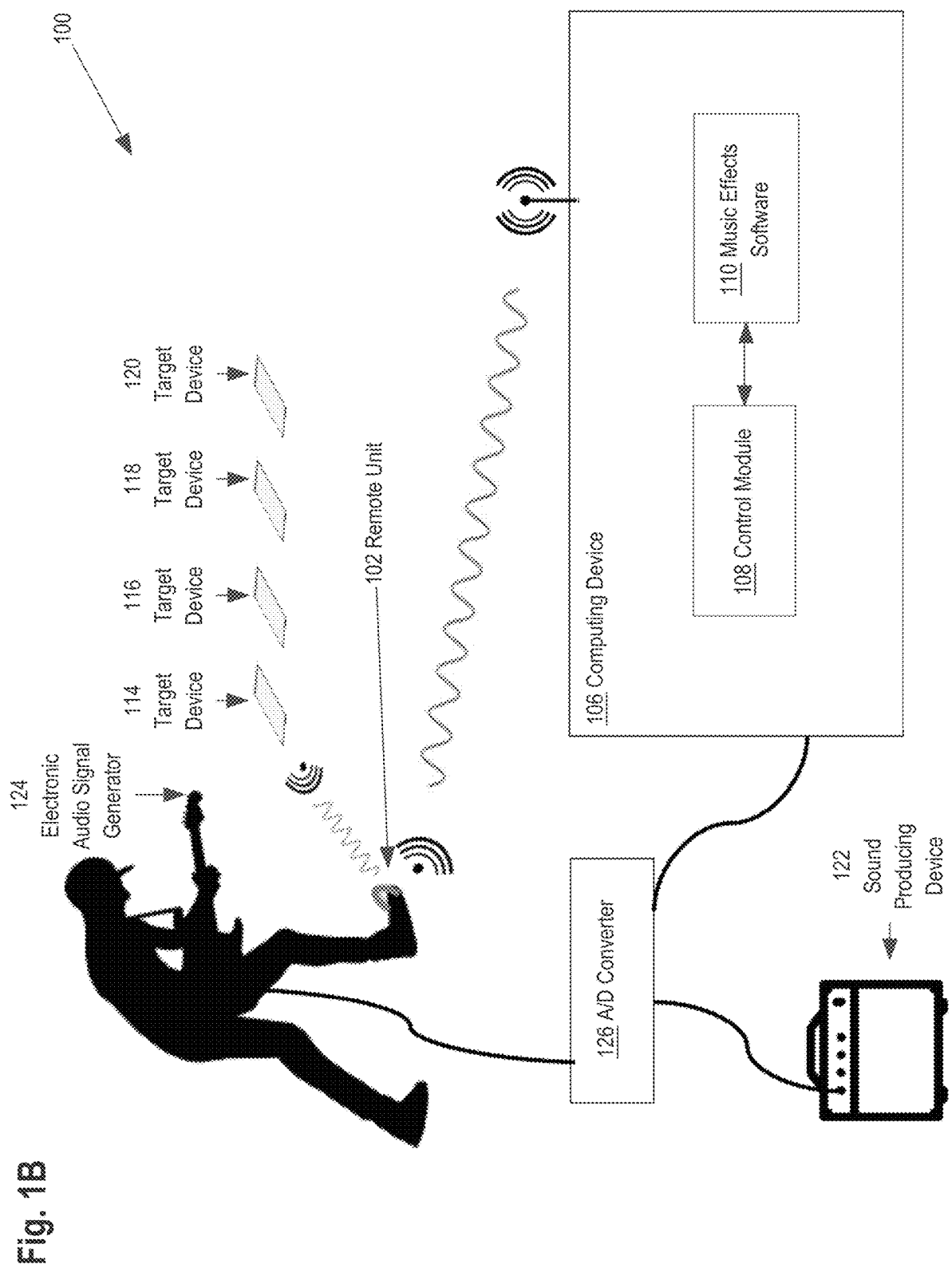
FIG. 1B illustrates different view of the example computer system in which various embodiments may be practiced.

FIG. 1B is a different view of system 100, according to an embodiment.

As depicted in FIG. 1B, system 100 may additionally comprise an electronic audio signal generator 124 and an A/D converter 126. Electronic audio signal generator 124 may comprise an electronic audio signal generating device such as a musical instrument that produces an electronic audio signal which may include an electric guitar, bass guitar, or acoustic guitar.

As a functional example of system 100, electronic audio signal generator 124 generates an electronic audio signal and the signal is transmitted to the A/D converter 126. The A/D converter converts the electronic audio signal, which may comprise converting an analog signal to a digital signal. The electronic audio signal is received at computing device 106. Music effects software 110 executing on computing device 106 may modify the electronic audio signal and transmit the modified electronic audio signal through the A/D converter to the sound producing device 122. The sound producing device 122 produces a sound corresponding to the modified electronic audio signal.

As electronic audio signals are generated by electronic audio signal generator 124, processed and/or modified by computing device 106, and transmitted to sound producing device 122, remote unit 102 may scan target devices 122-120 to extract identification information, such as an RFID tag address. The remote unit 102 then transmits the identification information to the computing device 106 for processing. The computing device 106 may execute instructions that identify a mapping of RFID tag addresses to MIDI event messages, use the mapping to identify the corresponding MIDI event message, identify a mapping that associates MIDI event messages to virtual action identifiers, and use the mapping to identify the corresponding virtual action identifier. The corresponding virtual action identifier may be used by the music effects software 110 to select instructions to modify an electronic audio signal. Additional details and other example interactions are described through this application.

3. EXAMPLE FUNCTIONAL IMPLEMENTATION

Figure 4:
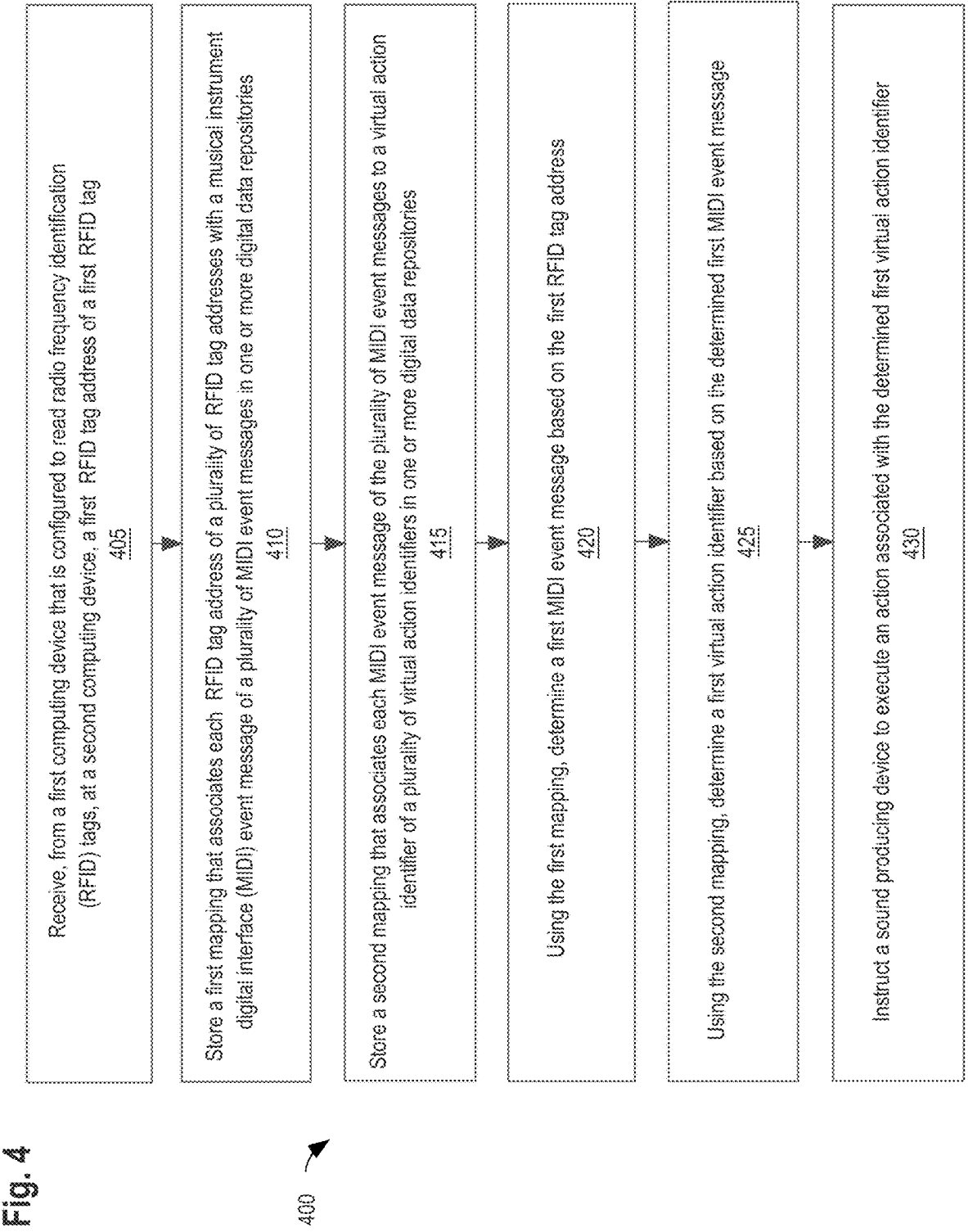
FIG. 4 illustrates an example flowchart of a method for wireless control and modification of electronic audio signals of remote electronic devices.

FIG. 4 shows an example flowchart 400 of a method for wireless control of remote electronic devices.

Although the steps in FIG. 4 are shown in an order, the steps of FIG. 4 may be performed in any order and are not limited to the order shown in FIG. 4. Additionally, some steps may be optional, may be performed multiple times, or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described.

In step 405, a first RFID tag address of a first RFID tag is received from a first computing device at a second computing device. For example, remote unit 102 scans one or more of target devices 114-120 to retrieve the first RFID tag address of a first RFID tag. The remote unit 102 transmits the first RFID tag address to computing device 106 via network 104.

In an embodiment, an RFID tag can be attached to a foot board, musical instrument, microphone stand, clothing, key ring, necklace, watch, wallet, or a sub-dermal tag inserted somewhere in a user's body.

Figure 5:
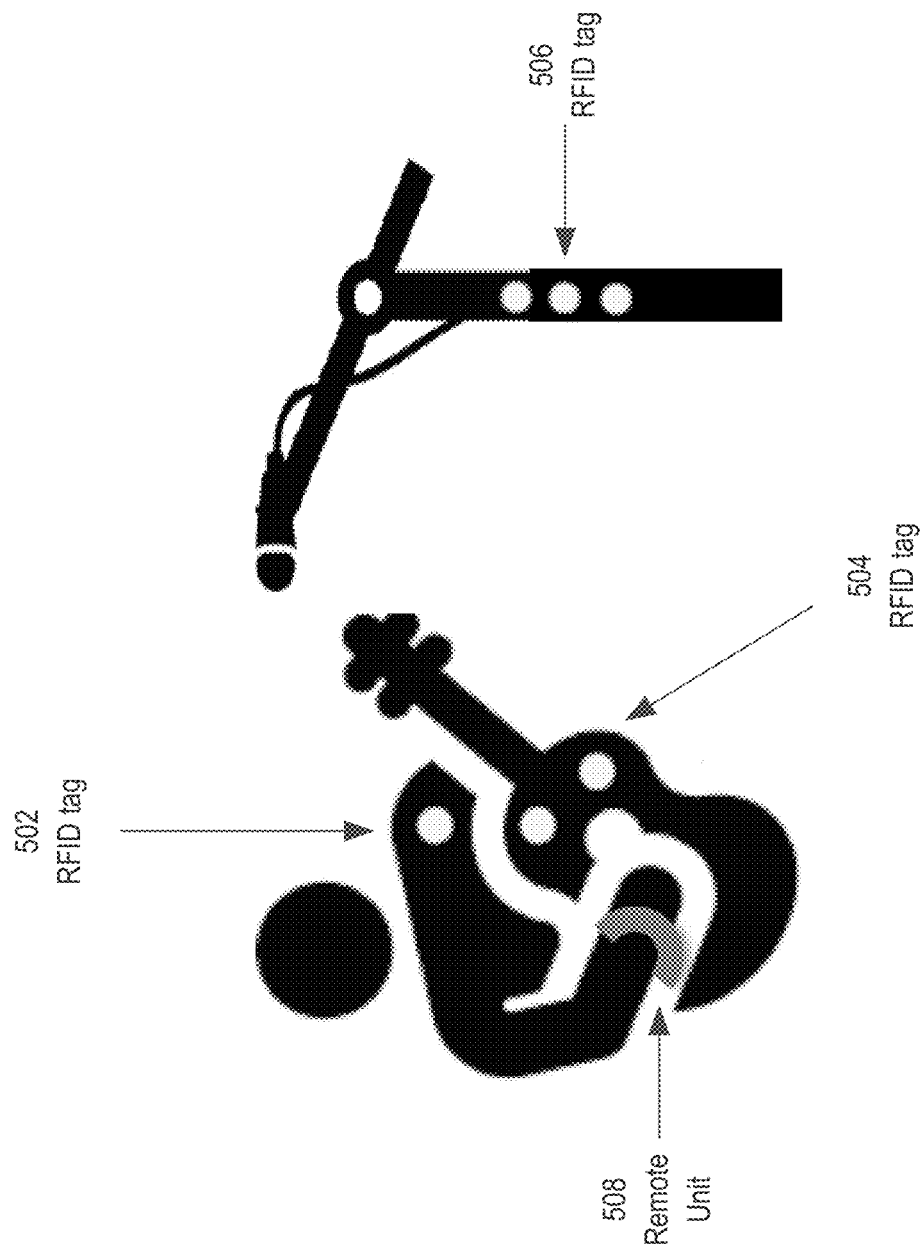
FIG. 5 illustrates RFID tags attached to a musical instrument, clothing, and a microphone stand, according to an embodiment of the invention.

FIG. 5 illustrates RFID tags attached to a musical instrument, clothing, and a microphone stand. For example, RFID tag 502 is attached to clothing of a performer. RFID tag 504 is attached to a musical instrument 504, such as an electric guitar. RFID tag 506 is attached to a microphone stand. When RFID tags 502, 504, 506 are scanned by remote unit 508, which, as pictured is attached to the wrist of a performer, corresponding RFID tag addresses are retrieved and transmitted to computing device 106 as described with respect to FIG. 1 and FIG. 2.

Figure 6:
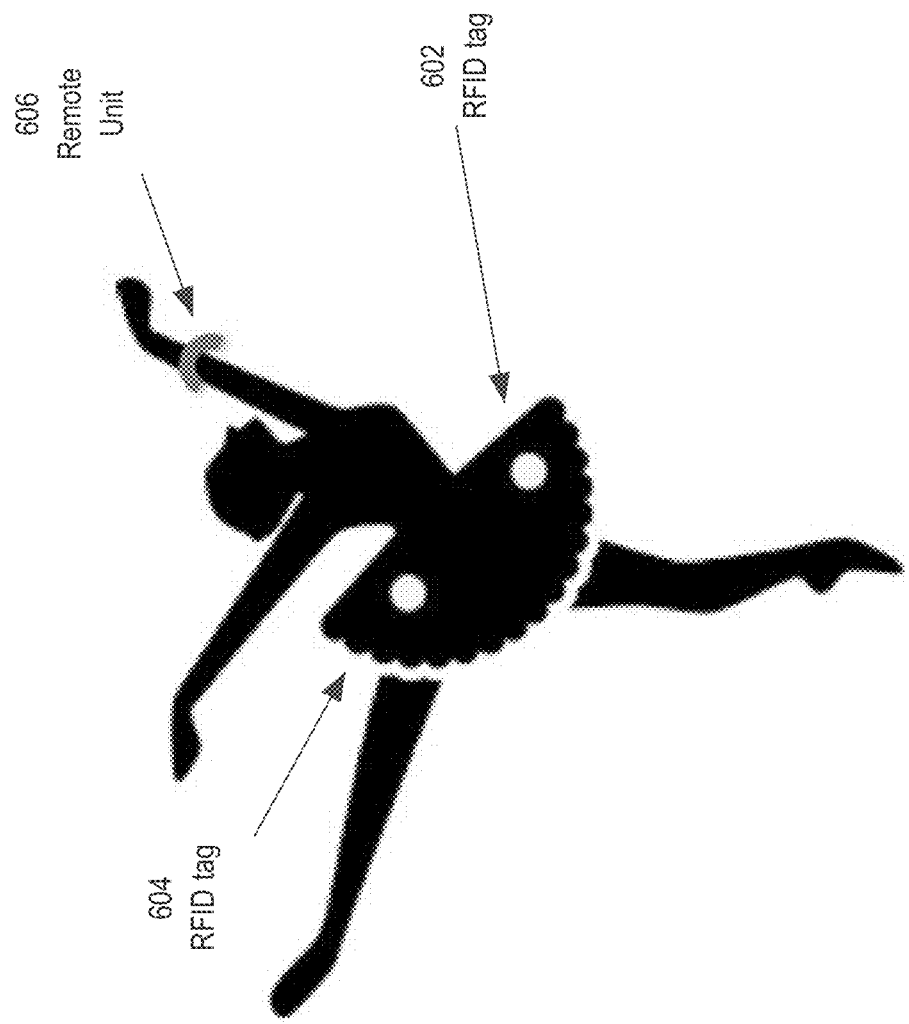
FIG. 6 illustrates RFID tags attached to clothing, according to an embodiment of the invention.

FIG. 6 illustrates RFID tags attached to clothing. For example, RFID tag 602 is attached to clothing of a user. RFID tag 604 is also attached to clothing of a performer. When RFID tags 602, 604 are scanned by remote unit 606, which, as pictured is attached to the wrist of a performer, corresponding RFID tag addresses are retrieved and transmitted to computing device 106 as described with respect to FIG. 1 and FIG. 2.

Returning to FIG. 4, in step 410, a first mapping that associates each RFID tag address of a plurality of RFID tag addresses with a musical instrument digital interface (MIDI) event message of a plurality of MIDI event messages is stored in one or more digital data repositories. The plurality of RFID tag addresses includes the first RFID tag address. For example, a user may interact with a graphical user interface (GUI) coupled, directly or indirectly to computing device 106 to create or configure the first mapping of the plurality of RFID tag addresses to the plurality of MIDI event messages. Computing device 106 then may store the first mapping in mapping database 112.

In an embodiment, a MIDI event message comprises a MIDI command which can be transported in accordance with MIDI communication protocol. In some embodiments, a MIDI event message includes MIDI data parameters that correspond to a MIDI command included in the MIDI event message. For example, a MIDI event message may include a MIDI command that represents a note-off, note-on, after-touch, control-change, or pitch-bend event. MIDI data parameters corresponding to a note-on event may include a key number parameter that represents a particular key or note, and an attack velocity parameter that represents the velocity of a key or note.

In step 415, a second mapping that associates each MIDI event message of the plurality of MIDI event messages to a virtual action identifier of a plurality of virtual action identifiers is stored in one or more digital data repositories. For example, a user may interact with a graphical user interface (GUI) coupled, directly or indirectly to computing device 106 to create or configure a second mapping of the plurality of MIDI event messages to the plurality of virtual action identifiers. The GUI for configuring the second mapping may be accessible by a user via music effects software 110. Computing device 106 then may store the second mapping in mapping database 112 or in an internal database associated with computing device 106.

In step 420, using the first mapping, a first MIDI event message is determined based on the first RFID tag address. For example, computing device 106 may query mapping database 112 to retrieve the first MIDI event message mapped to the first RFID tag address from the first mapping stored in mapping database 112.

In step 425, using the second mapping, a first virtual action identifier is determined based on the determined first MIDI event message. For example, computing device 106 may query mapping database 112 to retrieve the first virtual action identifier mapped to the first MIDI event message determined in step 420 from the second mapping stored in mapping database 122.

In step 430, the second computing device instructs a sound producing device to execute an action associated with the determined first virtual action identifier. For example, computing device 106 transmits an action, or the result of an action, associated with the first virtual action identifier to be executed by sound producing device 122.

In an embodiment, a virtual action identifier is associated with an action. The action may include an action executed by computing device 106 or more specifically, music effects software 110 from FIG. 1. For example, a virtual action identifier may be associated with an action that includes music effects software 110 executing instructions to turn a virtual sound effect pedal on or off. As discussed herein, execution of music effects software may include executing one or more programs or instructions that virtually simulate functionality of sound effect pedals that can modify electronic audio signals. For example, music effects software 110 executing instructions may simulate a particular sound effect pedal that receives an electronic audio signal and modifies the electronic audio signal by manipulating digital data that represents the electronic audio signal. Modifications to the electronic audio signal may include introducing a delay, echo, or reverb effect to the electronic audio signal. The electronic audio signal may then be transmitted or communicated to another system component. Such communications may take place via one or more application programming interfaces (APIs) and may use one or more networks or communication channels.

In an embodiment, an electronic audio signal is received at the second computing device. The second computing device modifies the electronic audio signal based on an action associated with the determined first virtual action identifier. The second computing device transmits the modified electronic audio signal to the sound producing device causing the sound producing device to convert the electrical audio signal into a corresponding sound.

4. BENEFITS

Techniques described herein allow any number of virtual pedals to be created and programmed to enhance extensibility, scalability, and portability for a user or performer to control the modification of electronic audio signals. These techniques allow a user or performer to extend any existing hardware pedal board with additional virtual controls which are lightweight, portable, and operate wirelessly.

For performers of dance, benefits include being able to remotely control performance environment actions of either sound or lights by interaction with tags worn on clothing or a costume. Techniques herein enable singers to control stage lighting or vocal effects themselves without requiring special cues to be coordinated with offstage personnel.

Additional benefits include eliminating constraints of having effects controls solely placed on the floor. By attaching a wireless remote unit that includes an RFID reader to a wrist or arm instead of a foot, target devices such as RFID tags can be placed anywhere that a user or performer can access. Since RFID tags are extremely lightweight, thin, and have minimal footprint, RFID tags can be attached or placed directly on a user or performer's clothing, or anywhere that can be in proximity to a wireless RFID reader.

Other techniques for wireless control of electronic musical instruments contemplate transmission devices implemented as a ring worn on the hand, or plectrum held in the hand, both of which interfere with a user or performer's playing posture and ability to effectively play an instrument. Techniques herein include the benefit of being 'worn' on the feet, leg, upper arm, without being held, leaving the performer's hands free for an instrument or other electronic audio signal generating device.

5. IMPLEMENTATION MECHANISMS—HARDWARE OVERVIEW

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 7 is a block diagram that illustrates an example computer system with which an embodiment may be implemented.

In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 208 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6. EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving, from a first computing device that is configured to read radio frequency identification (RFID) tags, at a second computing device, a first RFID tag address of a first RFID tag;
    storing, in one or more digital data repositories, a first mapping that associates each RFID tag address of a plurality of RFID tag addresses with a musical instrument digital interface (MIDI) event message of a plurality of MIDI event messages, the plurality of RFID tag addresses including the first RFID tag address;
    storing, in one or more digital data repositories, a second mapping that associates each MIDI event message of the plurality of MIDI event messages to a virtual action identifier of a plurality of virtual action identifiers;

using the first mapping, determining a first MIDI event message based on the first RFD tag address;
using the second mapping, determining a first virtual action identifier based on the first MIDI event message;
receiving, from an electronic audio signal generating device configured to generate electronic audio signals, at the second computing device, an electronic audio signal;
modifying the electronic audio signal to produce a modified electronic audio signal based on the action associated with the determined first virtual action identifier;
the second computing device transmitting the modified electronic audio signal to a sound producing device and causing the sound producing device to convert the electronic audio signal into a corresponding sound.

2. The method of claim 1, wherein modifying the electronic audio signal includes the second computing device manipulating digital data that represents the electronic audio signal.

3. The method of claim 1, wherein the sound producing device includes at least one of: a loudspeaker, guitar speaker, or headphones.

4. The method of claim 1, wherein the first mapping and second mapping are stored in the same digital data repository.

5. The method of claim 1, wherein the first mapping and second mapping are configured by a user providing input to a graphical user interface (GUI).

6. The method of claim 1, wherein each MIDI event message of the plurality of MIDI event messages comprises a MIDI command which can be transported in accordance with a MIDI communication protocol.

7. The method of claim 1, wherein the first MIDI event message comprises a MIDI command that represents a note-on event.

8. The method of claim 1, wherein the electronic audio signal generating device comprises computer software that is configured to generate electronic audio signals.

9. A computer system comprising:
first computing device that is configured to read radio frequency identification (RFID) tags;
a second computing device comprising: a networking interface that is communicatively coupled to the first computing device and to a sound producing device; one or more non-transitory computer-readable storage media storing one or more sequences of instructions which when executed cause the second computing device to perform:
receiving, from the first computing device, a first RFID tag address of a first RFID tag;
storing, in one or more digital data repositories, a first mapping that associates each RFID tag address of a plurality of RFID tag addresses with a musical instrument digital interface (MIDI) event message of a plurality of MIDI event messages, the plurality of RFID tag addresses including the first RFID tag address;
storing, in one or more digital data repositories, a second mapping that associates each MIDI event message of the plurality of MIDI event messages to a virtual action identifier of a plurality of virtual action identifiers;
using the first mapping, determining a first MIDI event message based on the first RFD tag address;
using the second mapping, determining a first virtual action identifier based on the first MIDI event message;
receiving, from an electronic audio signal generating device configured to generate electronic audio signals, at the second computing device, an electronic audio signal;
modifying the electronic audio signal to produce a modified electronic audio signal based on the action associated with the determined first virtual action identifier;
the second computing device transmitting the modified electronic audio signal to the sound producing device and causing the sound producing device to convert the electronic audio signal into a corresponding sound.

10. The system of claim 9, wherein modifying the electronic audio signal includes the second computing device manipulating digital data that represents the electronic audio signal.

11. The system of claim 9, wherein the sound producing device includes at least one of: a loudspeaker, guitar speaker, and headphones.

12. The system of claim 9, wherein the first mapping and second mapping are stored in the same digital data repository.

13. The system of claim 9, wherein the first mapping and second mapping are configured by a user providing input to a graphical user interface (GUI).

14. The system of claim 9, wherein each MIDI event message of the plurality of MIDI event messages comprises a MIDI command which can be transported in accordance with a MIDI communication protocol.

15. The system of claim 9, wherein the first MIDI event message comprises a MIDI command that represents a note-on event.

16. The system of claim 9, wherein the electronic audio signal generating device comprises computer software that is configured to generate electronic audio signals.

17. A computer system comprising:
an electronic guitar configured to generate electronic audio signals;
a first computing device that is configured to read radio frequency identification (RFID) tags;
a second computing device comprising: a networking interface that is communicatively coupled to the electronic guitar, first computing device, and to a loudspeaker; one or more non-transitory computer-readable storage media storing one or more sequences of instructions which when executed cause the second computing device to perform:
receiving, from the first computing device, a first RFID tag address of a first RFID tag;
storing, in one or more digital data repositories, a first mapping that associates each RFID tag address of a plurality of RFID tag addresses with a musical instrument digital interface (MIDI) event message of a plurality of MIDI event messages, the plurality of RFID tag addresses including the first RFID tag address;
storing, in one or more digital data repositories, a second mapping that associates each MIDI event message of the plurality of MIDI event messages to a virtual action identifier of a plurality of virtual action identifiers;
using the first mapping, determining a first MIDI event message based on the first RFD tag address;
using the second mapping, determining a first virtual action identifier based on the first MIDI event message;
receiving, from the electronic guitar, an electronic audio signal;

modifying the electronic audio signal to produce a modified electronic audio signal based on an action associated with the virtual action identifier;

transmitting the modified electronic audio signal to the loudspeaker and causing the loudspeaker to convert the electronic audio signal into a corresponding sound.

\* \* \* \* \*